June 21, 1955 F. J. SCHMIDT 2,711,148
RELEASABLE TONGUE AND PIN PONTOON CONNECTION
Filed March 10, 1950
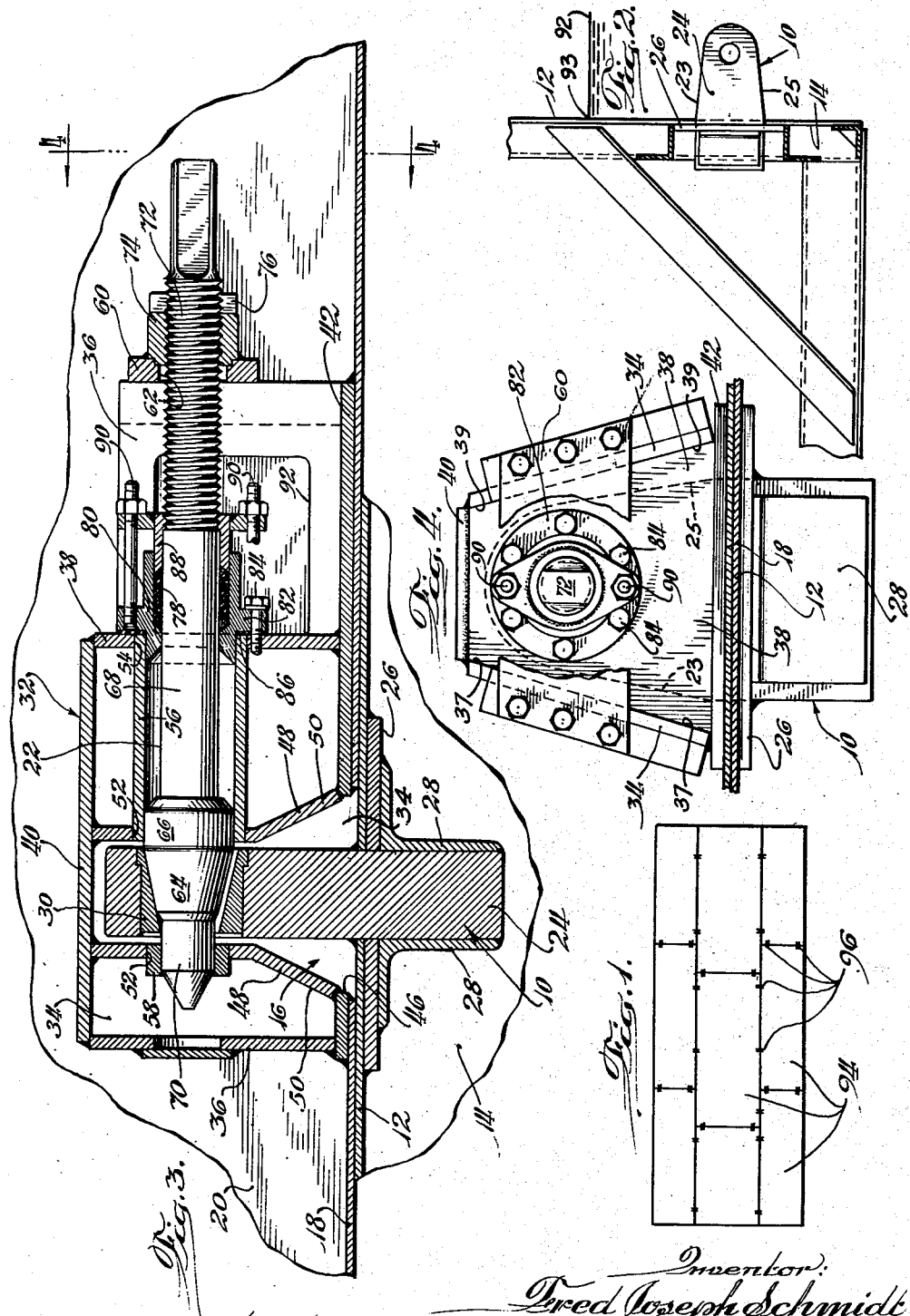
Inventor:
Fred Joseph Schmidt
By Hinkle, Horton, Ahlberg, Hausmann & Kupper
Attorneys

United States Patent Office 2,711,148
Patented June 21, 1955

2,711,148

RELEASABLE TONGUE AND PIN PONTOON CONNECTION

Fred Joseph Schmidt, Fort Wayne, Ind., assignor to American Steel Dredge Company Inc., Fort Wayne, Ind., a corporation of Indiana Application March 10, 1950, Serial No. 148,850

9 Claims. (Cl. 114—.5)

The present invention relates to a tongue and pin or latch connection for securing together adjacent bodies and more particularly to such a connection which is effective to cam the bodies toward each other when the connection is being made between the tongue and pin.

In constructing floats for dredges or the like by securing together a plurality of watertight pontoons, the adjacent sides thereof may be readily secured together along their upper ends by riveting, bolting or some other conventional connection, but this cannot readily be done below the water line of floating pontoons. Since they normally are floated before being connected together, the need for a convenient watertight connection is apparent. The tongue and pin or latch connection disclosed herein was devised particularly to fill the need for such a connection. Although it is shown and described as it might be constructed and used for this purpose, it is to be understood that this is done for the purpose of illustration only, properly to disclose the invention as required by the patent statutes, as other uses may be found for the connection to which it may be readily adapted.

One object of the invention is to provide a tongue and latch or pin connection which is particularly adaptable for use in securing together the confronting sides of adjacent watertight pontoons in a float or the like constructed from a plurality of interconnected pontoons.

Another object of the invention is to provide a tongue and latch connection for securing together adjacent bodies which is effective to cam the bodies toward each other while the connection is being made between the tongue and latch.

Yet another object of the invention is to provide a connection for securing together adjacent bodies which comprises a tongue on one of these bodies and structure on the other body having a socket-like opening defined therein to receive the tongue and supporting a latching member which may be extended across the tongue and has a part cooperating with a complementary part on the tongue to draw the two bodies together and to form a fast connection between the same.

A further object of the invention is to provide a new and improved tongue and latch connection which may be constructed to provide a watertight union between adjacent pontoons or the like below the waterline thereof.

A still further object of the invention is to provide a tongue and latch connection for securing together adjacent bodies which is releasable.

A more general object of the invention is to provide a new and improved tongue and pin or latch connection which is of relatively simple construction so that it may be fabricated readily and at low cost from common metal stock, but which nevertheless is exceedingly sturdy in construction and entirely satisfactory in use.

These and other objects, advantages and capabilities of the invention will become apparent from the following description wherein reference is had to the accompanying drawings, in which:

Fig. 1 is a diagrammatic deck plan of a float consisting of a plurality of pontoons indicating the places at which the improved connection disclosed herein may be located;

Fig. 2 is a fragmentary transverse vertical sectional view on a reduced scale through a pontoon showing a tongue forming part of the connection of the present invention secured in position;

Fig. 3 is a horizontal sectional view on a larger scale of the adjoining pontoons in a float taken medially of the improved pin and tongue connection by means of which they are secured together; and Fig. 4 is a vertical transverse view taken in the direction of the arrows on the line 4—4 of Fig. 3 with portions of the device broken away more clearly to disclose the structure thereof.

Referring to Fig. 3, it will be seen that the connection of the present invention comprises a flat, vertically wide, projecting tongue 10 adapted to be secured to a side wall 12 of one of the two pontoons which are to be secured together, a portion of this pontoon being shown at 14. Means defining a vertically wide socket 16 is provided at a corresponding or registering location in that side 18 of the second pontoon 20 which is to confront the side 12 on the first pontoon. The socket 16 receives the tongue 10 when the two pontoons are in the position it is desired to secure them and a latch member 22 comprising a lock pin is then extended transversely of the socket so as to bring a camming surface thereon into cooperative engagement with a complementary camming surface on the tongue 10 for drawing the pontoons 14 and 20 together until the sides 12 and 18 thereof are in firm abutting engagement, and firmly anchoring the same when the sides are brought to this position.

The tongue 10 is preferably constructed as a subassembly and comprises a flat bar of steel 24 extending through an aperture in a generally rectangular base plate 26. These two parts are firmly secured together and the union reinforced by suitable structural members 28 which may be made from angle stock and have one of their flanges welded to the opposite long sides of the tongue bar 24 and their second flanges welded to the inner side of base plate 26 along the edges of the aperture through which the tongue bar 24 passes. Preferably the base plate 26 is located substantially two-thirds of the distance from the free end of the tongue bar 24 to its opposite end.

The camming surface on the tongue may be formed in a bushing 30 of suitable material secured in an aperture in the free end of the tongue bar 24. This bushing is internally tapered to define a frusto-conical through aperture in the tongue, the tapered internal walls of the bushing forming the camming surface. For a purpose to be described, the top and bottom sides 23 and 25 of the tongue bar 24 are convergingly tapered from the base plate 26 toward the apertured end of the tongue bar. This completes the description of the construction of the tongue 10. It is fixed to the side wall 12 of pontoon 14 with its free end projecting outwardly through an aperture in this side wall by welding the base plate 26 to the inner side of the wall 12 to provide a watertight union between these parts.

The socket 16 may be formed by opposed wall structure in a box-like chest 32 (Fig. 3) which carries the latching member or pin 22. This pin-supporting chest has walls made from relatively heavy metal plate including duplicate top and bottom walls 34, parallel end walls 36 and 38 having top and bottom edges 37 and 39 which taper convergingly from one end to the other, a relatively short side wall 40, and a second side wall 42 of considerably greater length than side wall 40 which forms a base for the chest. These walls are secured together along their adjoining edges by welded fluidtight joints as indicated in the drawings, thus to make the chest 22 watertight. It should be noted that end wall 38 is secured to an intermediate part of the base 42 and the top and bottom walls 34 so that these latter three walls extend beyond the chest proper. It should be further noted that the converging edges 37 and 39 of walls 36 and 38 support the top and bottom walls 34 in converging relation inwardly from the wall 42. The bottom wall 34 inclines upwardly and the top wall 34 inclines downwardly.

A generally rectangular aperture 46 is provided in the base 42 adjacent one end of that portion of the latter between end walls 36 and 38. This aperture approximates in height the height of the base plate 42 and is appreciably wider than the thickness of the tongue bar 24 so that its overall cross-sectional dimensions are appreciably larger than the overall cross-sectional dimensions of the tongue bar 24. The reason for this will be explained hereinafter. Extending inwardly to the short side wall 40 from the opposite vertically extending edges of the aperture 46 are opposed socket plates 48 which are welded by watertight joints to the opposite edges of this aperture, to the side wall 40, and to the top and bottom walls 34 of the chest. Socket plates 48, therefore, cooperate with the portions of the top and bottom walls 34 extending therebetween to form the socket 16 previously mentioned which opens to the exterior and preferably is watertight. The walls of the socket 16 are therefore; on each side, the walls 48; at the inner end, that portion of the side wall 40 between walls 48; and, at the top and bottom (Fig. 4), that part of the convergent top and bottom walls 34 between walls 48.

The opposed socket plates 48 taper convergingly from their outer ends as indicated at 50 so that the width of the inner end of the socket 16 between these walls is only slightly greater than the thickness of the tongue bar 24. By reason of the taper in the socket plates 48 and the inclination of the top and bottom walls 34 (Fig. 4), the socket 16 is provided with a bell mouth for a purpose which will appear.

In the portion of the socket plates 48 defining the narrow part of socket 16 these plates are provided with coaxial apertures 52 which are also coaxial with an aperture 54 in the end wall 38. The opposite ends of a steel bearing tube 56 are supported in apertures 52 and 54, while the coaxial aperture 52 in the left-hand socket plate 50 (Fig. 3) has a bushing 58 secured therein of any suitable metal such as chrome nickel to form a bearing coaxial with bearing tube 56.

Extending across and bolted to the free ends of the top and bottom walls 34 is an end plate 60 which has an aperture 62 therein coaxial with the apertures 52 and 54.

The latching member comprising the pin 22 has an enlarged head including a camming surface formed by a frusto-conically shaped portion 64 complementary in shape to the shape of the frusto-conical aperture in the bushing 30 carried by tongue 10. On its end of larger diameter the head of lock pin 22 is provided with an enlarged cylindrical portion 66 journaled for rotational and axial movement in the bearing tube 56. An elongated shank 68 extends axially from this cylindrical portion 66. On its end of smaller diameter the frusto-conical portion 64 of the lock pin head has a terminal portion 70 of reduced diameter which terminates in a substantially conical tip. At the position of greatest extension to which the lock pin 22 is axially movable this terminal portion 70 extends into and is journaled in the bushing 58 fixed in the left-hand socket plate 48 (Fig. 3) while the enlarged cylindrical journal portion 66 remains journaled in the bearing tube 56. Rigid support is thus provided for lock pin 22 on opposite ends or sides of the frusto-conical portion 64.

The shank 68 of the lock pin which projects out of bearing tube 56 and through the aperture 62 in end plate 60 at all positions of the lock pin is flattened at its outer end to facilitate gripping thereof by an operating tool such as a wrench. For a portion of its length the shank 68 is threaded as indicated at 72 and this threaded portion is in screw-threaded engagement with an internally threaded sleeve or nut 74 fixed in the aperture 62. This threaded portion of the shank is of sufficient extent so that the lock pin 22 may be advanced and retracted the distance necessary to extend its head including terminal portion 70 and frusto-conical portion 64 across the socket 16 or fully to retract the same into the bearing tube 56 so that the lock pin lies wholly on one side of the socket 16. A lock nut 76 may be provided on the threaded portion of the shank 68 for locking the lock pin at a desired position of adjustment.

In order to prevent the entry of water into a pontoon through the bearing tube 56 a suitable packing 78 is provided around an intermediate part of the shank 68. This packing is carried in a stuffing box 80 having a base flange 82 secured to the end wall 38 by means of a plurality of cap screws 84 (Fig. 4). A gasket 86 is provided to form a fluidtight seal between the end wall 38 and the base flange 82, and the packing is compressed by a gland 88, the amount of compression exerted being adjustable by means of adjusting screws 90. Preferably, the top and bottom walls 34 in the pin supporting chest 32 are cut out at their rear ends as indicated at 92 (Fig. 3) so that access may be readily had to the cap screws 84 and adjusting screws 90.

From the above description it will be noted that a watertight latching member supporting chest has been provided. This chest is fixed to the side wall 18 of pontoon 20 by welding the base plate 42 to the inner side of the side wall 18 so that the chest 32 is located inside the pontoon. Side wall 18 has an aperture registering with the aperture 46 in the base of the chest so that the socket 16 is open to the exterior.

Briefly to describe the use of the improved tongue and latch or lock pin connection in securing together adjacent pontoons, one arrangement of pontoons to form a float is indicated diagrammatically in Fig. 1, the individual pontoons being indicated by the number 94 and the location of the tongue and lock pin connections between adjacent pontoons by the number 96.

Conventionally the individual pontoons in a float are floated before they are secured together, tongues being secured adjacent the bottom edge of the side walls of one pontoon below the water level 92 or waterline 93 (Fig. 2) thereon, and lock pin supporting chests 32 being secured at corresponding locations on those side walls of other pontoons which are to be secured to the first-mentioned pontoon before these pontoons are floated. While the pontoons are being brought into a position at which the tongues 10 project into the sockets 16 in the lock pin chests 32 registering therewith, the lock pins 22 are of course in fully retracted position. Once the adjacent pontoons have been brought into assembled relation, they may be lashed together and the contiguous walls thereof may then be connected to each other.

Adjacent their upper ends these contiguous walls may be secured by conventional means such as riveting or bolting. The lower ends of these walls are then connected to each other by turning up the lock pins 22 in all of the lock pin chests 32. In view of the fact that the apertures in each bushing 30 and the frustoconical portion 64 on the head of each lock pin 22 are complementary and the complementary sides of these two parts taper convergingly or acutely relative to the direction of forward movement of the lock pin 22, these sides cooperate to cam the adjacent pontoons 14 and 20 toward each other when the lock pin is moved forward, thus bringing the contiguous sides 12 and 18 of the pontoons into firm abutting engagement as best seen in Fig. 3. The lock pins 22 may then be locked in position by tightening the lock nuts 76 against the threaded nuts or sleeves 74.

It will be noted in Fig. 3 that the terminal portion 70 of the head on lock pin 22 and the cylindrical journal portion 66 are both firmly journaled in their respective bearings on opposite sides of the tongue bar 24 when the lock pin is in extended position. Thus the lock pin 22 is firmly held in position. By so constructing the parts that the frusto-conical portion 64 of the lock pin head will not fully seat in the bushing 30 when the two adjacent pontoons have been drawn together sufficiently to bring the sides 12 and 18 into firm abutting engagement, assurance is had that these sides will always be firmly drawn together.

This construction furthermore is designed to accommodate for slight inaccuracies in manufacture or assembly and for wear on the bushing 30 or frusto-conical portion 64 on the lock pin.

It is to be noted that the bringing together of adjacent pontoons is greatly facilitated by the construction of the tongues 10 and sockets 16. As previously explained, the top and bottom sides of the tongue bars 24 are convergingly tapered toward their free ends while the top and bottom walls 34 of the lock pin supporting chests 32 are inclined to correspond generally to the taper in these sides of the tongue bars 24. Furthermore, since the socket plates 48 diverge outwardly adjacent their outer ends, a bell mouth is provided on the socket 16 so that the tongue bars 24 may readily be engaged in the mouths of the sockets and, once engaged therein, the tongue bars are guided to their final positions by the inclined walls of the sockets.

Another advantage of the connection herein described arises from the fact that it is readily accessible from the inside of the pontoons so that the pontoons may more conveniently be secured together. Furthermore, this connection is completely watertight due to the watertight joints between the bases 26 of the tongues 10 and the sides of the pontoons and the watertight construction of the lock pin supporting chests 32 previously described. The only place at which leakage might occur is around the shank of lock pins 22 but the packing 78 prevents leakage there. This packing is readily replaced, should that be desired, or the degree to which it is compressed may be adjusted by turning the adjusting screws 90 one way or the other.

Finally it will be noted that the lock pins 22 are readily releasable, if that is desired.

While a preferred embodiment of the invention has been shown and described which is particularly adapted for securing together adjacent pontoons, it is to be understood that this was done for the purpose of illustration only and that the connection is adaptable for other uses. It will be apparent that numerous variations and modifications thereof may be made without departing from the underlying principles of the invention, whether the pin and tongue connection is used to secure together adjacent pontoons or for securing together other adjacent bodies. It is desired, therefore, by the following claims to include within the scope of the invention all such variations and modifications by which substantially the results of the invention may be obtained through the use of substantially the same or equivalent means.

I claim:

1. A connection for securing together adjacent bodies comprising a tongue fixedly secured to one of said bodies and having a free end projecting outwardly from a side of said body, said tongue having a through aperture in its free end, opposed spaced wall structure secured to the other of said bodies and projecting inwardly from the outer face thereof at a position to register with said tongue, said opposed wall structure being open to the exterior and internally dimensioned to receive said tongue relatively snugly, a lock pin having a head projectable across the space defined by said wall structure from a retracted position wholly on one side thereof, the aperture in said tongue and the head on said pin having complementary surfaces tapered convergingly relative to the direction of forward movement of said head for camming said bodies toward each other when the head is advanced across said socket, axial projections on opposite ends of said head, and cooperating bearing structure on opposite sides of the space defined by said wall structure snugly to receive the opposite axial projections on said head when the latter is at extended position and firmly to hold the same.

2. A connection for securing together adjacent pontoons or the like comprising a tongue fixedly secured to one of said pontoons to project outwardly from one side thereof, said tongue having a through aperture in its free end, wall structure secured to the other of said pontoons defining a liquidtight inwardly extending socket adapted to receive said tongue, a latching member, bearing structure to support said latching member for movement transversely relative to said socket from a position wholly on one side thereof, said aperture and the forward end of said latching member having complementary camming surfaces tapered acutely relative to the direction of forward movement of said latching member cooperating to cam said bodies toward each other upon forward movement of the latching member and firmly to hold them in juxtaposed relation when the latching member is in extended position, and means to form a liquidtight seal between the latching member and the interior of said socket.

3. A connection for securing together adjacent pontoons or the like comprising a tongue fixedly secured to one of said pontoons to project outwardly from one side thereof, said tongue having a through aperture in its free end, wall structure secured to the other of said pontoons defining an inwardly extending socket adapted to receive said tongue, a latching member, bearing structure to support said latching member for movement transversely relative to said socket from a position wholly on one side thereof, said aperture and the forward end of said latching member having complementary camming surfaces tapered acutely relative to the direction of forward movement of said latching member and cooperating to cam said bodies toward each other upon forward movement of the latching member and firmly to hold them in juxtaposed relation when the latching member is in extended position, an elongated shank on said latching member projecting through said wall structure into said pontoon at all positions of the latching member, and means rendered effective through said shank to advance and retract said latching member.

4. A connection as defined in claim 3, wherein the shank is of substantially cylindrical shape and cooperating threads are provided on said shank and on a part fixed relative to said shank for advancing and retracting said latching member when the shank is rotated in opposite directions.

5. A connection for securing together adjacent pontoons or the like comprising a vertically oriented tongue fixedly secured to one of said pontoons to project outwardly from one side thereof, said tongue having at least its upper and lower projecting sides convergingly tapered toward its free end and an aperture in said free end, wall structure secured to the other of said pontoons including walls defining a watertight inwardly extending vertically oriented socket having an inner portion adapted snugly to receive the outer end of said tongue, said walls defining said socket being inclined divergingly at least along their outer portions to form an outwardly flaring bell mouth on the socket for guiding the tongue therein, a latching member having a head on its forward end, bearing structure to support said head for movement transversely relative to said socket, complementary camming surfaces on said head and the aperture in said tongue tapered acutely relative to the direction of forward movement of said head into said socket for camming said bodies toward each other upon forward movement of the head and firmly to hold them in juxtaposed relation when the head is in extended position, and means to form a liquid-tight seal between said latching member and the interior of said socket.

6. A connection for securing together adjacent pontoons or the like comprising a tongue fixedly secured to one of said pontoons to project outwardly therefrom, said tongue having a through aperture in its free end, wall structure fixedly secured to the other of said pontoons defining an outwardly open socket adapted to receive the free end of said tongue, a lock pin including a head movable transversely of said socket, axial projections on opposite ends of said head including an axial projection on the leading end of said head adapted freely to pass through the aperture in said tongue, and a projection on the trailing end of said head, an elongated shank extending axially relative to said latter projection, complementary camming surfaces on said head and in the aperture in said tongue cooperating to cam said pontoons toward each other upon forward movement of the lock pin head, an elongated bearing projecting outwardly from said socket through said wall structure and receiving the projection on the trailing end of said head to support the latter for movement transversely of said socket, said shank projecting outwardly of said elongated bearing at all positions of the head, a bearing in said wall structure coaxial with and opposite said elongated bearing adapted snugly to receive the projection on the leading end of said head, and means rendered effective upon rotation of said shank to effect movement of said head transversely relative to said socket between a position wholly on one side of said socket and a position in which said head is seated in the aperture in said tongue and the projections on the opposite ends of said heads are engaged in their respective bearings.

7. A connection for securing together adjacent pontoons or the like comprising a tongue fixedly secured by a watertight union to one of said pontoons to project outwardly therefrom, said tongue having a through aperture in its free end, wall structure fixedly secured by a watertight union to the other of said pontoons defining an outwardly open watertight socket adapted to receive the free end of said tongue, a lock pin including a head movable transversely of said socket, axial projections on opposite ends of said head including an axial projection on the leading end of said head adapted freely to pass through the aperture in said tongue, and a projection on the trailing end of said head, an elongated shank extending axially relative to said latter projection, complementary camming surfaces on said head and in the aperture in said tongue cooperating to cam said pontoons toward each other upon forward movement of the lock pin head, an elongated bearing projecting outwardly from said socket through said wall structure and receiving the projection on the trailing end of said head to support the latter for movement transversely of said socket, said shank projecting outwardly of said elongated bearing at all positions of the head, a bearing in said wall structure coaxial with and opposite said elongated bearing adapted snugly to receive the projection on the leading end of said head, means to effect movement of said head transversely relative to said socket between a position wholly on one side of said socket and a position in which said head is seated in the aperture in said tongue and the projections on the opposite ends of said heads are engaged in their respective bearings, and watertight packing between the portion of the shank of said pin passing through said elongated bearing and the latter.

8. A connection for securing together adjacent pontoons or the like comprising a tongue fixedly secured to one of said pontoons to project outwardly therefrom, said tongue having an aperture in its free end, means forming a watertight box-like chest fixedly secured to the inner wall of the other of said pontoons, wall structure in said chest defining an inwardly extending socket at a position to register with said tongue having walls inclined divergingly along the outer end portion thereof to form an outwardly flaring bell mouth on the socket for guiding the tongue therein, the inner end portion of the socket being internally dimensioned to receive snugly the free end of said tongue, a lock pin having a head and a shank projecting from said head, coaxial bearing structure in said socket wall structure and one wall of said chest supporting the head of said lock pin for axial movement between a position wholly on one side of said socket and a position in which said head projects into the aperture in said tongue, said shank projecting through the bearing structure in the said wall of said chest and into said pontoon at all positions of said head, complementary camming surfaces on said head and in the aperture in said tongue cooperating when said head is advanced to cam said pontoons toward each other and firmly to hold the same in juxtaposed relation when the head is in extended position, and means to advance and retract said head in response to opposite rotary movement of said shank.

9. A connection for bringing together a pair of floating pontoons with sides in tight contact and so securing said sides, comprising a plurality of tongues fixedly secured to and projecting outwardly from a side of one of said pontoons, below the normal waterline thereof, said tongues each having an aperture adjacent its free end and having a bushing securely mounted therein, said bushing being internally tapered to define a frusto-conical through aperture, a plurality of wall structures secured to the inner walls, and not projecting beyond the outer walls of the second pontoon at positions to register with and to receive the tongues of said first pontoon, said wall structures being open to the exterior of said second pontoon and being dimensioned internally to define wide mouthed openings having sides converging to define sockets to receive snugly the free ends of said tongues, a latch for each pair of tongues and wall structures having a tapered head and means to advance and retract said latch, said head when advancing being adapted to engage the inner face of the frusto-conical aperture in each tongue thereby to cam and draw said pontoons tightly together at their adjacent sides, and fastening means above the normal waterline of said pontoons rigidly connecting the upper portions of said sides of said pontoons together.

References Cited in the file of this patent

UNITED STATES PATENTS

| 820,974 | Hilpert | May 22, 1906 |
| 1,084,975 | Steiner | Jan. 20, 1914 |
| 1,233,489 | McDougall | July 17, 1917 |
| 1,300,744 | Lieske | Apr. 15, 1919 |
| 1,351,117 | Newhall | Aug. 31, 1920 |
| 1,764,903 | Spear | June 17, 1930 |
| 1,793,056 | Carns | Feb. 17, 1931 |
| 2,328,693 | Taylor | Sept. 7, 1943 |
| 2,369,615 | Smith | Feb. 13, 1945 |

FOREIGN PATENTS

| 59,788 | Austria | June 25, 1913 |
| 709,266 | France | May 12, 1931 |